United States Patent [19]

Renaud

[11] Patent Number: 4,498,566
[45] Date of Patent: Feb. 12, 1985

[54] PULL TYPE CLUTCH RELEASING BEARINGS AND METHOD OF ATTACHING CLUTCH RELEASE BEARING TO CLUTCH FORK

[75] Inventor: Pierre Renaud, Le Plessis-Trevise, France

[73] Assignee: Valeo, Paris, France

[21] Appl. No.: 377,069

[22] Filed: May 11, 1982

[30] Foreign Application Priority Data

May 15, 1981 [FR] France ............................. 81 09710

[51] Int. Cl.³ .............................................. F16D 23/14
[52] U.S. Cl. ................................... 192/98; 192/110 B; 192/99.5
[58] Field of Search ...................... 192/99.5, 98, 110 B

[56] References Cited

U.S. PATENT DOCUMENTS

| | | | |
|---|---|---|---|
| 2,328,133 | 8/1943 | Foster | 192/99.5 X |
| 3,079,806 | 3/1963 | Jones | 192/98 X |
| 3,640,364 | 2/1972 | Utton | 192/98 |
| 3,744,607 | 7/1973 | Hausinger | 192/98 |
| 4,046,436 | 9/1977 | Brown | 192/45 X |
| 4,186,828 | 2/1980 | Renaud | 192/98 |
| 4,276,974 | 7/1981 | Ladin | 192/98 |
| 4,310,083 | 1/1982 | Maucher | 192/99.5 X |
| 4,393,968 | 7/1983 | Dee | 192/98 |

FOREIGN PATENT DOCUMENTS

| | | | |
|---|---|---|---|
| 2410761 | 12/1977 | France | 192/98 |
| 2454018 | 4/1980 | France . | |
| 2073353 | 10/1981 | United Kingdom . | |

*Primary Examiner*—Rodney H. Bonck
*Assistant Examiner*—David D. House
*Attorney, Agent, or Firm*—Charles E. Brown

[57] ABSTRACT

A clutch release bearing of the type comprising an actuator fork 13, acting on an operating member 10, two axial guide flats 32A, 32B formed in diametrically opposite positions, and two radial arms 34A, 34B.

With respect to the axial plane P of the assembly which is substantially perpendicular to the guide flats the axial guide flats 32A, 32B are entirely positioned, one on the first side of this median axial plane P, the other on the other side of this median axial plane P, so that a bayonet or quarter-turn type assembly procedure on the actuator fork 13 is possible.

16 Claims, 4 Drawing Figures

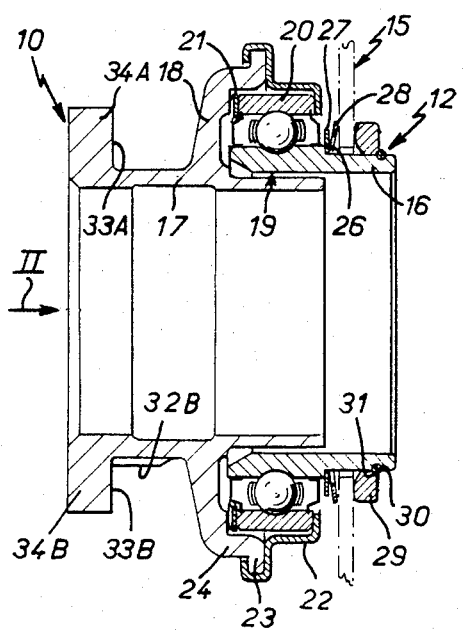
FIG.1
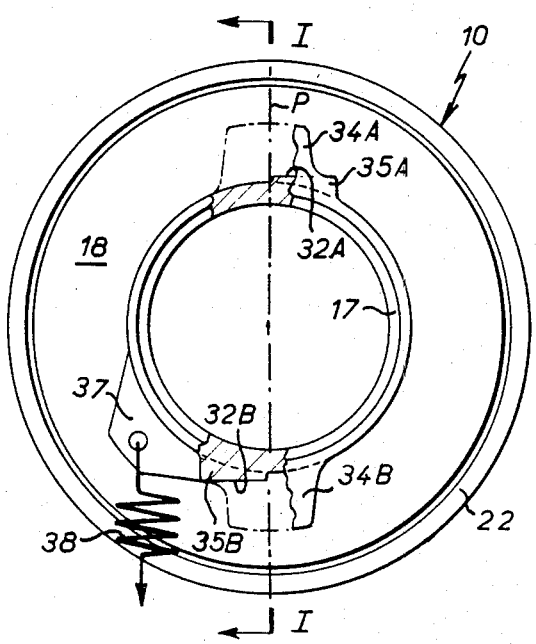
FIG.2
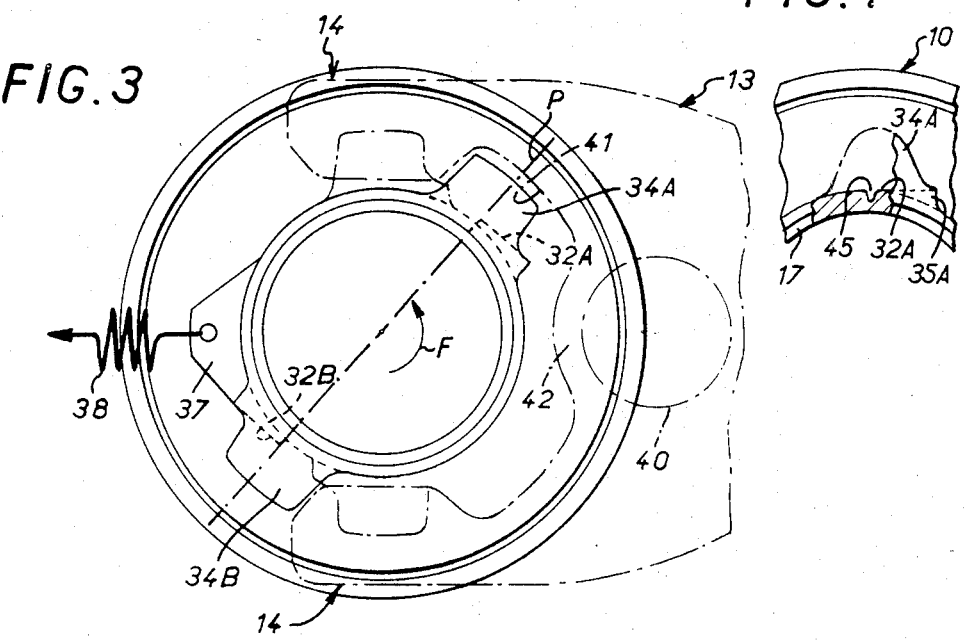
FIG.3
FIG.4

PULL TYPE CLUTCH RELEASING BEARINGS AND METHOD OF ATTACHING CLUTCH RELEASE BEARING TO CLUTCH FORK

BACKGROUND OF THE INVENTION

1. Field of the Invention

The present invention concerns clutch release bearings suitable for automotive vehicles.

2. Description of the Prior Art

A clutch release bearing comprises an actuator device, in practice a fork, hereinafter referred to as an actuator fork, acting on an operating member, and a drive element, mounted rotatable with respect to said operating member, and which, under the action of said operating member, acts on the release device of a clutch.

In practice, to act on the operating member of such a clutch release bearing, the associated actuator fork has two arms, and said operating member includes, for said arms of said actuator fork, two axial flats providing axial guidance, in diametrically opposite positions, and two transverse flats providing axial support, also in diametrically opposite positions, and usually, but not necessarily, at right angles to the axial guide surfaces.

This application concerns more particularly a pull type clutch release bearing, that is to say a clutch release bearing exerting a tractive force on the release device of the clutch in question, wherein its drive element is engaged behind said clutch release device.

In this type of clutch release bearing, the transverse flats providing axial support for the actuator fork are usually formed respectively on two radial arms projecting radially from a sleeve on the operating member, and axially positioned with respect to the drive element, on the other side of the axial guide surfaces also provided on said sleeve for said actuator fork.

For reasons of symmetry, the axial guide flats extend on both sides of the axial plane of the assembly which is substantially perpendicular to them, and, most often, this plane, hereinafter referred to as the median axial plane of the assembly, passes through the median point of the radial arms.

One of the problems encountered when mounting such clutch release bearings results from the fact that the mounting procedure involves a relative engagement of the clutch release bearing and actuator fork, the fork arms having to be engaged transversely between the radial arms which the operating member of the clutch release bearing possesses for its action, and the running part of said operating member.

In other words, the fork arms must be engaged behind the radial arms of the clutch release bearing.

In a pull type clutch release bearing, said clutch release bearing is supported by a clutch, its drive element being engaged behind the clutch release device, whereas the actuator fork is usually independently supported by the housing of a gearbox, being mounted at a median articulation point to pivot about a transverse spindle or a fixed ball joint.

It is therefore necessary, on the increasing relative axial proximity of said gearbox housing and said clutch, usually supported by the housing of the corresponding engine, to engage progressively the fork arms behind the radial arms of the clutch release bearing.

This operation, involving presenting the actuator fork initially substantially flatwise, in the horizontal plane, and, by fitting, gradually moving said actuator fork to the vertical, as said fork arms engage behind said radial arms of said clutch release bearing, is difficult to do, more particularly when said actuator fork is mounted pivoting about a ball joint, because of the additional degree of freedom of movement of said ball joint.

Moreover, it may prove impossible, since the pivoting movement of the actuator fork required to move from the horizontal to the vertical plane requires a substantial space, which is not always available.

The objective of the present invention is to provide an arrangement which, taking advantage of the fact that the operating member of a clutch release bearing is mounted rotatable with respect to the drive element with which it is associated, enables these difficulties to be surmounted and facilitates in all cases the assembly of a pull type clutch release bearing.

SUMMARY OF THE INVENTION

The invention consists firstly in a clutch release bearing of the type comprising cooperable with an actuator fork an operating member, and a drive element, mounted rotatable with respect to said operating member, and which, under the action of said operating member, acts on the release device of a clutch, said operating member comprising a sleeve, and, to facilitate action of said fork device, two axial flats providing axial guidance, formed on said sleeve in diametrically opposite positions, and two transverse flats providing axial bearing surfaces formed respectively on two radial arms, projecting radially from said sleeve and axially positioned on the other side of said axial guide surfaces with respect to said drive element, wherein said axial guide surfaces are entirely positioned, with respect to the axial plane of the assembly, which is substantially perpendicular to them, hereinafter referred to as the median axial plane of the assembly, one on one side of said median axial plane, the other on the other side of said median axial plane.

This results, despite the presence of the fork arms, in the fact that the operating member of such a clutch release bearing can be pivoted in one direction about the axis of the assembly with respect to the drive element with which it is associated, without any interference by said fork arms with the corresponding axial guide surfaces of the clutch release bearing, opposing said pivoting movement.

The invention further consists in a method of relative assembly of the bayonet type or quarter-turn type between the clutch release bearing and its actuator fork, for the engagement of said actuator fork behind the radial arms of the clutch release bearing.

The present invention further consists in a method for the relative engagement of a clutch release bearing supported by a clutch, said clutch release bearing comprising an operating member with a sleeve equipped with two radially projecting arms diametrically opposite one another, and a drive element linked to the release device of said clutch and mounted rotatable with respect to said operating member, and an actuator fork which, supported by the housing of a gearbox, has two fork arms engaging behind said radial arms of said clutch release bearing, wherein, in a first stage, on the increasing relative axial proximity of said clutch and said housing, said actuator fork is held substantially perpendicular to the axis of the assembly, and said operating member of said clutch release bearing is held in an angular position in which said radial arms mounted thereon are angularly between said catches of said actuator fork, and, wherein, in a second stage, on completion of said axial movement, after relative axial engagement of said catches of said actuator fork beyond said radial arms of said operating member of said clutch release bearing, said operating member is rotated about the axis of the assembly until said radial arms are in registry with the fork arms.

Such a relative engagement of a clutch release bearing and an actuator fork is particularly quick and easy to implement.

It is then sufficient to maintain the angular position of the operating member of the clutch release bearing, to avoid the radial arms of the sleeve of the operating member escaping from the fork arms of the actuator fork, by accidentally pivoting backwards.

According to the invention, this sleeve has for example a radially projecting lug suitable for attaching thereto a holding spring connected to a fixed point.

The present invention further consists in an actuator fork for a clutch release bearing suitable for implementing the method briefly described above.

This actuator fork is of the type, of itself known, comprising a median articulation point, and, at its free end, two fork arms suitable to act on the associated clutch release bearing.

The actuator fork must be adapted so that the associated clutch release bearing can be axially engaged between the fork arms, and according to the invention, said clutch release bearing is held in an angular position in which the radial arms of the operating member providing axial support are angularly offset relative to the fork arms.

According to the invention, the internal section of the free end of this actuator fork comprises a recess between its median articulation point and at least one of the fork arms.

Through such an arrangement, which is produced by sideways deformation of the fork arms in question, at right angles to the recess provided for the passage of a radial arm of the operating member of the associated clutch release bearing, the actuator fork according to the invention can advantageously be adapted to a previously existing installation, without modifying the lever arms positioned between its median articulation point and its free end, and between this median articulation point and the end at which it is attached to an actuator mechanism.

Through the arrangement according to the invention, the distances between the median articulation point of the actuator fork, which is prescribed, and either of its ends, can advantageously be retained.

Other objects and advantages will appear from the following description of examples of the invention when considered in connection with the accompanying drawings, and the novel features will be particularly pointed in the appended claims.

BRIEF DESCRIPTION OF THE DRAWINGS

FIG. 1 is an axial cross-section on the line 1—1 in FIG. 2.

FIG. 2 is a view in elevation, on the arrow in FIG. 1, showing a clutch release bearing in accordance with the invention.

FIG. 3 is a view similar to that in FIG. 2 and illustrates the engagement of the clutch release bearing according to the invention with an actuator fork.

FIG. 4 is a view similar to that of FIG. 2 showing another embodiment.

DESCRIPTION OF THE PREFERRED EMBODIMENTS

The Figures constitute a general representation of the clutch release bearing according to the invention comprising an actuator device, in practice a actuator or release fork, acting on an operating member 10, and a drive element 12 mounted rotatable with respect to said operating member 10, and which, under the action of said operating member 10, acts on the release device of a clutch.

The actuator fork is partially represented by the broken line in FIG. 3, under the general reference 13.

As is known per se, this type of actuator fork has a median articulation point 40, represented by a circle in FIG. 3, by which it is mounted pivoting at a fixed point, for example around a ball joint, with two fork arms 14 at its free end, to act on operating member 10.

Like the actuator fork 13, the clutch release device is partially represented by the broken line in FIG. 1, under the general reference 15.

This may be for example the free ends of the radial fingers of a diaphragm.

Operating member 10 includes an axial sleeve 17, for sliding engagement on any support guide, not shown in the Figures, and, transversely, a flange 18 for its axial connection with drive element 12.

As is known per se, the drive element consists in the internal ring 16, extended axially for this purpose, of a ball bearing 19 the outer ring 20 of which, urged by an axially acting elastic washer 21, such as a crinkle washer trade name "ONDUFLEX", for example, supported by flange 18 of operating member 10, is axially supported against a cover 22 axially attached to said flange 18 of operating member 10 and, for example, as shown, crimped onto a radial edge 23 formed at the end of an axial collar 24 contiguous at its periphery with said flange 18.

In the embodiment shown, the clutch release bearing is therefore a permanently self-centered bearing, the drive element 12 having radially, in contact with cover 22, and under the control of elastic washer 21, freedom of transverse movement, within the limits of an annular radial clearance provided between said cover 22 and the sleeve 17.

With a pull type clutch release bearing, drive element 12 is adapted to exert tractive effort on the clutch release device 15.

In the embodiment shown, it is for this reason axially attached in both directions to clutch release device 15.

It comprises on the side of clutch release device 15 flange 18 of operating member 10, a shoulder 26 on which, through a backing washer 27, is supported an elastic washer 28 which bears on said clutch release device 15 and, on the other side of clutch release device 15, to act on said clutch release device, there is an associated ring 29, bearing axially against an elastic split ring 30 engaged in a groove 31 provided for this purpose close to the free end of the clutch release device.

In an alternative embodiment, drive element 12 may simply axially bear against the clutch release device 15, on the side remote from the operating member 10.

Since these arrangements are already well known, and do not form part of the present application, no further details of them will be provided here.

To facilitate action of actuator fork 13, sleeve 17 of operating member 10 comprises two axial guide flats 32A, 32B providing axial guidance, formed on said sleeve 17 parallel to each other, and parallel to the axis of the assembly, in diametrically opposite positions, and two transverse flats 33A, 33B defining bearing surfaces.

In the embodiment shown in FIGS. 1 to 3, axial guide flats or surfaces 32A, 32B are formed on radially projecting bosses 35A, 35B on said sleeve 17 of operating member 10.

With a pull type clutch release bearing, the transverse flats or surfaces 33A, 33B is formed respectively on two radial arms 34A, 34B, projecting radially outwardly from said sleeve 17 and axially positioned on the other side of axial guide flats or surfaces 32A, 32B with respect to drive element 12.

In the embodiment shown, radial arms 34A, 34B are at right angles to axial guide surfaces 32A, 32B; in an alternative embodiment, they may be offset from this position.

Axial plane P is the median axial plane of the assembly and is substantially perpendicular to transverse flats or surfaces 33A, 33B. The axial plane P also passes through the centerline of radial arms 34A, 34B as illustrated in FIGS. 2 and 3. Thus; it can be seen that radial arms 34A, 34B are at right angles to the flats or surfaces 33A, 33B. Further, there are axial guide flats or surfaces 32A, 32B which are positioned on alternative sides of the axial plane P and are perpendicular to the transverse flats or surfaces 33A, 33B as illustrated in FIGS. 2 and 3.

In the embodiment shown, as well as radial arms 34A, 34B, sleeve 17 of operating member 10 carries a radially projecting lug 37 suitable for attaching thereto a holding spring 38.

In the embodiment shown, lug 37 is in the same plane as radial arms 34A, 34B, being positioned angularly between said radial arms 34A, 34B, and, in the preferred embodiment, one radial arm 34B is angularly closer to it than the other.

In the embodiment shown, the radial arm angularly closer to lug 37 is arm 34B with which is associated a guide surface 32B positioned on the same side as lug 37 with respect to the median axial plane P of the assembly.

In this embodiment, lug 37 is at 45° with respect to radial arm 34B, but a different angle may be used.

Lug 37 may be in a plane other than that of the radial arms 34A, 34B, or may be axially offset from said axial support arms.

It is not essential that it also be angularly offset with respect to said radial arms.

For the relative engagement of a clutch release bearing as described above, supported by a clutch, attached by its drive element 12 to clutch release device 15, and actuator fork 13, which is then supported by the gearbox housing, the invention consists in the following method: in a first stage, on the increasing relative axial proximity of said clutch and said housing, holding actuator fork 13 substantially perpendicular to the axis of the assembly, and, as shown in the solid line in FIG. 3, using spring 38 duly attached for this purpose to a fixed point, for example integral with said housing at its other end, holding operating member 10 of the clutch release bearing in an angular position in which radial support arms 34A, 34B mounted thereon are angularly between fork arms 14 so that they can axially engage together, and, in a second stage, on completion of said axial movement, after relative axial engagement of fork arms 14 beyond radial arms 34A, 34B of operating member 10 of the clutch release bearing, rotating said operating member 10 about the axis of the assembly until said radial arms are at right angles to said fork arms 14 of said actuator fork 13, as shown in broken lines in FIG. 3.

As will be understood, the limited chordal extent of the axial guide surfaces 32A, 32B, according to the invention, ensures that when operating member 10 is displaced angularly about the axis of the assembly, all interference of axial surfaces 32A, 32B providing axial guidance, with fork arms 14 of actuator fork 13 is avoided, the angular movement being in the direction for which, as shown by arrow F in FIG. 3, said axial surfaces 32A, 32B providing axial guidance, extend fully back from the median axial plane P of the assembly.

To maintain the final angular position of operating member 10 with respect to drive element 12, in the embodiment shown, spring 38 is simply attached to another suitable fixed point, as shown in the solid line in FIG. 2.

In the embodiment represented, this second fixed point is at right angles to the first.

It may take the form, for example, of any kind of pin, not shown, located for this purpose on either of the housings in question.

Spring 38 is then preferably arranged to act substantially perpendicularly to axial guide surfaces 32A, 32B.

According to an alternative embodiment not shown, instead of being held by a spring as before, the final angular position of operating member 10 may be maintained by a rod, pin, lug or similar device, suitably interposed between said operating member and a fixed point.

The same may apply for the angular position of said operating member necessary for the axial engagement of the clutch release bearing between fork arms 14.

As shown in FIG. 3, to maintain the lever arm of actuator fork 13 as mentioned above, and reduce the radial dimensions of the assembly, the internal section of the free end of actuator fork 13 comprises, according to the invention, between the median articulation point 40 of said actuator fork 13, and at least one of fork arms 14, and in practice each of said catches 14, of said actuator fork 13, a recess 41 suitable for the passage of the axial support radial arm 34A of operating member 10 of the clutch release bearing, on the axial engagement of said clutch release bearing between said catches 14.

In other words, according to the invention, the internal section of the free end of actuator fork 13 comprises a boss 42 projecting externally at right angles to said median articulation point 40, and, beyond a point of inflection set back on the inner side, said recess 41, involving an outward deformation of the corresponding material.

According to the alternative embodiment shown in FIG. 4, each of the radial arms 34A, 34B of operating member 10, only one of which is shown on the Figure, has an outer peripheral contour rendered semi-circular.

In addition, in this alternative embodiment, for a reduction in the width of the actuator fork, and thus a minimization of the transverse dimension of the assembly, instead of being formed on a boss, each of axial guide surfaces 35A, 35B of operating member 10, only one of which is shown on the Figure, extends in a plane substantially tangential to sleeve 17 of said operating member 10.

To facilitate machining, a slot 45 which extends parallel to the axis of the assembly, delimits laterally each of said axial guide surfaces 35A, 35B at the point of their connection to sleeve 17, as shown.

The present invention is not restricted to the embodiments shown, nor to the form of implementation described, but encompasses all alternative embodiments and implementations.

I claim:

1. A clutch release bearing comprising an operating member cooperable with an actuator fork, a drive element rotatably mounted with respect to said operating member, said drive element adapted to coact with release means of a clutch for effecting clutch disengagement, said operating member comprising a sleeve having axial guide flats diametrically opposite each other, transverse flats defining axial bearing surfaces formed respectively on radial arms protruding radially outwardly from said sleeve, said transverse flats being disposed axially to a side of said axial guide flats remote from said drive element, said clutch release bearing having a median axial plane perpendicular to said axial guiding flats, one of said axial guide flats being disposed entirely on one side of said median axial plane and the other said axial guide flat being disposed entirely on the other side of said median axial plane.

2. A clutch release bearing according to claim 1, wherein each of said axial guide flats is formed on a radial projection on said sleeve of said operating member.

3. A clutch release bearing according to claim 1, wherein each of said axial guide flats lies in a plane substantially tangential to said sleeve of said operating member.

4. A clutch release bearing according to claim 1, wherein a slot parallel to the axis of the assembly laterally delimits each of said axial guide flats at the point at which it joins said sleeve of said operating member.

5. A clutch release bearing according to claim 1, wherein the outer peripheral contour of each of said radial arms of said operating member is part circular.

6. A clutch release bearing according to claim 1, wherein said sleeve of said operating member carries a radially projecting lug having means for attaching a holding spring for maintaining the angular position of said operating member.

7. A clutch release bearing according to claim 6, wherein said lug is positioned angularly between said radial arms.

8. A clutch release bearing according to claim 7, wherein said lug is closer to one of said radial arms, and is disposed on the same side of said median axial plane as said one radial arm.

9. A clutch release bearing according to claim 8, wherein said lug lies in the same transverse plane as said radial arms.

10. A method for the relative engagement of a clutch release bearing supported by a clutch on an actuator fork, in which said clutch release bearing comprises an operating member having a sleeve equipped with two radial arms diametrically opposite each other, and a drive element adapted to be attached to release means of the clutch and mounted rotatable with respect to said operating member, and the actuator fork mounted on a gearbox housing the actuator fork having engageable arms behind said radial arms of said clutch release bearing, wherein the improvement comprises the following steps: first increasing relative axial proximity of said clutch and said housing gearbox while, holding said actuator fork substantially perpendicular to the axis of the release bearing, and temporarily attaching said operating member of said clutch release bearing in an angular position in which said radial arms are angularly between said fork arms; continuing relative axial movement until said fork arms are axially beyond said radial arms of said operating member of said clutch release bearing; detaching the operating member for permitting angular movement thereof; and rotating said operating member about the axis of the release bearing until said radial arms are in registry with said fork arms.

11. A method according to claim 10, wherein said operating member is resiliently temporarily attached in the angular position in which said radial arms are angularly offset relative to said fork arms, said operating member being attached by a spring connected to a fixed point.

12. A method according to claim 11, wherein to secure said operating member in the angular position in which said radial arms are in registry with said fork arms, said operating member is attached by said spring to another fixed portion, said fixed points subtending a right angle from the axis of said release bearing.

13. A method according to claim 10 including resiliently attaching said operating member in the angular position in which said radial arms are in registry with said fork arms, said operating member being attached by a spring connected to a fixed point.

14. A method according to claim 13, wherein said spring is positioned so that it acts substantially perpendicularly to said axial guide flats.

15. A clutch release bearing and actuator fork assembly comprising an operating member cooperable with an actuator fork, a drive element rotatably mounted with respect to said operating member, said drive element adapted to coact with release means of a clutch for effecting clutch disengagement, said operating member comprising a sleeve having axial guide flats diametrically opposite each other, transverse flats defining axial bearing surfaces formed respectively on radial arms protruding radially outwardly from said sleeve, said transverse flats being disposed axially to a side of said axial guide flats remote from said drive element, said clutch release bearing having a median axial plane perpendicular to said axial guiding flats, one of said axial guide flats being disposed entirely on one side of said median axial plane and the other said axial guide flat being disposed entirely on the other side of said median axial plane, said actuator fork having two arms and a pivot point along its center line, said fork arms being cooperable with said radial arms and said axial guide flats, at least one of said fork arms having along its inner edges between the free end of the said fork arm and said pivot point of said actuator fork a recess for accommodating the relative axial movement of said radial arms from one side to the other of said fork arms.

16. The assembly according to claim 15, wherein a boss is formed in line with said pivot point adjacent said recesses.

* * * * *